(12) United States Patent
Proefrock et al.

(10) Patent No.: US 11,828,841 B2
(45) Date of Patent: Nov. 28, 2023

(54) METHOD AND DEVICE FOR ESTIMATING THE HEIGHT OF A REFLECTOR OF A VEHICLE

(71) Applicant: JENOPTIK ROBOT GMBH, Monheim (DE)

(72) Inventors: Dima Proefrock, Hamburg (DE); Michael Trummer, Hildesheim (DE)

(73) Assignee: Jenoptik Robot GmbH, Monheim am Rhein (DE)

( * ) Notice: Subject to any disclaimer, the term of this patent is extended or adjusted under 35 U.S.C. 154(b) by 620 days.

(21) Appl. No.: 16/977,682

(22) PCT Filed: Mar. 1, 2019

(86) PCT No.: PCT/EP2019/055114
§ 371 (c)(1),
(2) Date: Sep. 2, 2020

(87) PCT Pub. No.: WO2019/166614
PCT Pub. Date: Sep. 6, 2019

(65) Prior Publication Data
US 2020/0393561 A1    Dec. 17, 2020

(30) Foreign Application Priority Data

Mar. 2, 2018   (DE) .................... 10 2018 104 808.4

(51) Int. Cl.
*G01S 13/931*    (2020.01)
*G01S 7/41*    (2006.01)
(Continued)

(52) U.S. Cl.
CPC ............ *G01S 13/931* (2013.01); *G01S 7/415* (2013.01); *G01S 13/589* (2013.01); *G01S 13/92* (2013.01); *G01S 2013/93272* (2020.01)

(58) Field of Classification Search
CPC ...... G01S 13/931; G01S 7/415; G01S 13/589; G01S 13/92; G01S 2013/93272;
(Continued)

(56) References Cited

U.S. PATENT DOCUMENTS 5,371,718 A * 12/1994 Ikeda .................... G01S 7/4004
                                                          367/91
9,140,788 B2    9/2015 Kuehnle et al.
(Continued)

FOREIGN PATENT DOCUMENTS

CN          105047020 A      11/2015
DE    10 2012 107 445 A1     5/2014
(Continued)

*Primary Examiner* — Donald H B Braswell
(74) *Attorney, Agent, or Firm* — Muncy, Geissler, Olds & Lowe , P.C.

(57) ABSTRACT

A method for estimating the height of a reflector of a vehicle, the method including a reading step, in which at least one reflection signal from the reflector of the vehicle is read at one time and the at least one reflection signal representing at least one information item in respect of a relative speed of the vehicle. Further, the method includes a specifying step, in which an estimated value for the speed of the vehicle is specified. Finally, the method includes an ascertaining step, in which an estimated value for the height of the reflector is ascertained using the relative speed of the vehicle and the estimated value for the speed of the vehicle.

8 Claims, 7 Drawing Sheets

(51) Int. Cl.
   *G01S 13/58* (2006.01)
   *G01S 13/92* (2006.01)
(58) Field of Classification Search
   CPC .......... G01S 7/411; G01S 13/50; G01S 13/91; G01S 13/46
   See application file for complete search history.

(56) References Cited

U.S. PATENT DOCUMENTS

| | | |
|---|---|---|
| 9,341,707 B2 | 5/2016 | Lehning et al. |
| 2002/0169533 A1* | 11/2002 | Browne ................ B60R 21/013 701/45 |
| 2018/0059680 A1* | 3/2018 | Tateishi ................ G01S 17/931 |
| 2018/0259634 A1* | 9/2018 | Okamoto ................ G01S 7/414 |
| 2020/0271757 A1* | 8/2020 | Mardani ................ G01S 7/415 |

FOREIGN PATENT DOCUMENTS

| | | |
|---|---|---|
| DE | 10 2013 019 803 A1 | 5/2015 |
| DE | 10 2016 014 060 A1 | 6/2017 |
| EP | 2 674 776 A1 | 12/2013 |

* cited by examiner

Fig. 9 ical Application No. 10 2018 104 808.4, which was filed in Germany on Mar. 2, 2018, and which are both herein incorporated by reference.

METHOD AND DEVICE FOR ESTIMATING THE HEIGHT OF A REFLECTOR OF A VEHICLE

This nonprovisional application is a National Stage of International Application No. PCT/EP2019/055114, which was filed on Mar. 1, 2019, and which claims priority to German Patent Application No. 10 2018 104 808.4, which was filed in Germany on Mar. 2, 2018, and which are both herein incorporated by reference.

BACKGROUND OF THE INVENTION

Field of the Invention

The present invention relates to a method and an apparatus for estimating the height of a reflector of a vehicle. A computer program is also part of the subject matter of the present invention.

Description of the Background Art

A speed camera can determine the relative speed of individual reflectors of a vehicle and the position thereof in xy-coordinates. Here, the relative speed is the speed of a reflector in relation to the speed camera. However, the previously used radar systems do not evaluate the object height of the reflectors. A blanket object height is assumed, for example 1 meter above the roadway surface, and this is combined by calculation with the known installation height of the speed camera. Various disadvantages emerge as a result thereof. As a result of the unknown height of the reflector, it is not possible to correctly convert the measured relative speed into the absolute object speed. Depending on whether the assumed object height is too high or too low, the calculated object speed can also be too low or too high. High objects, e.g., trucks, deviate strongly from the blanket object height assumption of one meter, and so the speed measurement error is located outside the 3% tolerance limit. Thus, an estimate of the height of the reflector of a vehicle is very helpful for meeting the demands on the quality of the speed measurement. Furthermore, an estimate of the height is very helpful for the classification of vehicles since the vehicle class (e.g., automobile or truck) correlates strongly with the height.

SUMMARY OF THE INVENTION

It is therefore an object of the present invention to provide a method for estimating the height of a reflector of a vehicle and an apparatus for estimating the height of a reflector of a vehicle, according to the main claims. Advantageous embodiments and developments of the invention emerge from the following dependent claims.

The method approach presented here allows a height of at least one reflector and/or of a plurality of reflectors of a vehicle to be estimated and/or measured, with various model assumptions being taken into account. Advantageously, this method approach yields an improved vehicle classification and a more accurate measurement of a vehicle speed.

A method for estimating the height of a reflector of a vehicle is presented, the method including the following steps:

reading at least one reflection signal from the reflector of the vehicle at one time, the at least one reflection signal representing at least one information item in respect of a relative speed of the vehicle;

specifying an estimated value for the speed of the vehicle; and ascertaining an estimated value for the height of the reflector using the relative speed of the vehicle and the estimated value for the speed of the vehicle.

A reflector can be a reflex reflector or an emission surface or an emission region of the body of the vehicle, which is securely disposed on a vehicle and which preferably casts the beams of incident light back in the direction of the radiation source. In particular, the reflector can be embodied in this context to reflect a transmission signal of a transmitter device in the form of a reflection signal. By way of example, the reflector can be manufactured from plane mirrors or any other material that reflects a transmission beam. The vehicle can be a vehicle for conveying persons, for example of a vehicle driving in highly automated fashion, a bus or a truck, or else a small delivery truck. The estimated value for the speed can be a value from an approximate (initial) estimation of a speed of a vehicle. Here, the estimated value for the speed can be used to ascertain an estimated value for the height of the reflector. The estimated value for the height can be an estimated value of a height of a reflector of a vehicle, which should be ascertained or estimated over the course of the method for estimating the height of a reflector of a vehicle.

The method approach presented here for estimating the height of a reflector of a vehicle may include the vehicle having at least one reflector near the road. Further, a plurality of reflectors can also be used in each measurement. The reflections from the reflectors over a plurality of time-offset measurements can be collected and used, a constant vehicle speed being assumed. What is particularly exploited for the implementation of the method is that the speed error as a result of an incorrectly assumed reflector height is significant near the radar and asymptotically tends to zero with increasing distance from the radar. The curve of the asymptotic function is determined by regression, for example, and the height estimate can thus already be implemented close to the radar provided a vehicle speed is constant.

According to one embodiment, the reflection signal in the reading step can further represent an information item in respect of a relative distance of the vehicle from a signal-emitting transmitter device and/or in respect of a height angle at which the reflector is disposed in relation to the signal-emitting transmitter apparatus, with, in the ascertaining step, the estimated value for the height of the reflector being further ascertained using the information item in respect of the relative distance of the vehicle from the signal-emitting transmitter device and/or the height angle, at which the reflector is disposed in relation to the signal-emitting transmitter apparatus. Here, the signal-emitting transmitter apparatus transmits a transmission signal, the reflection of which forms the reflection signal. Such an embodiment of the approach presented here offers the advantage of a particularly precise estimate for the height of the reflector.

Further, at least one second reflection signal from the reflector of the vehicle can be read at a second time in the reading step, the second reflection signal likewise representing at least one information item in respect of a relative speed of the vehicle here and the estimated value for the height of the reflector being further ascertained in the ascertaining step using the information item in respect of the relative speed of the vehicle from the second reflection signal. Such an embodiment of the approach presented here offers the advantage that a further improvement and verification of the estimate for the height of the reflector is facilitated by processing at least one second reflection signal from the same reflector, which is read and processed with a time offset after (or before) the first reflection signal.

Moreover, a checking step can be used to check whether the estimated value for the height is located within a tolerance range, the specifying and ascertaining steps being carried out repeatedly if the estimated value for the height is located outside of this tolerance range. Should the estimated value for the height be located outside of the tolerance range, a new estimated value for the speed is specified for the speed of the vehicle in the repeated specifying step, for example. Here, it is possible to continue estimating the height of the reflector (e.g., recursively) until the height values at which the reflector or reflectors are positioned on the vehicle are located within a tolerance range again and hence there is an estimate for the height of the reflectors that is as accurate as possible.

Here, a further check can be carried out in the checking step as to whether the estimated value for the height is located, in particular, within a tolerance range of between 0 and 4 meters on or above a roadway. Here, an estimated value for the height located outside of this tolerance range means the deviation of a vehicle height from the normal state and consequently advantageously allows an incorrect estimate for the height of the reflector to be deduced.

According to one embodiment, at least one further reflection signal from a further reflector of the vehicle can be read (e.g., at a further time) in the reading step, the at least further reflection signal representing an information item in respect of a relative speed of the vehicle and a further estimated value for the height of the further reflector being ascertained in the ascertaining step using the information item in respect of the relative speed of the vehicle from the further reflection signal. Such an embodiment of the approach presented here offers the advantage that, for example, a further improvement and verification of the estimate for the height of the vehicle overall is facilitated by processing at least one further reflection signal from a further reflector, the reflection signal being able to be read and processed with a time offset after the first and second reflection signal.

Further, there can be a renewed check in the checking step as to whether the estimated value for the height or the further estimated value for the height is located within the tolerance range, the specifying and ascertaining steps being carried out repeatedly if the estimated value for the height and/or the further estimated value for the height are located outside of the tolerance range. Should the estimated value for the height or the further estimated value for the height be located outside of the tolerance range, the specifying step is repeated and a new estimated value for the speed is specified for the speed of the vehicle. This can achieve a very precise estimate for the height of the reflector.

Finally, the height of the reflector of the vehicle can be calculated in the ascertainment step using a known height of the transmitter device. Advantageously, such an embodiment facilitates an improved vehicle classification and a more accurate measurement of a vehicle speed from the ascertained height of the reflector of the vehicle.

Moreover, an apparatus for estimating the height of a reflector of a vehicle is presented, said apparatus being embodied to drive and/or carry out the steps of the method for estimating the height of a reflector of a vehicle in corresponding devices. This embodiment variant of the invention in the form of an apparatus also allows the object underlying the invention to be achieved quickly and efficiently.

In the present case, an apparatus can be understood to mean an electrical device, which processes sensor signals and outputs control and/or data signals on the basis thereof. The apparatus can have an interface, which may be embodied in terms of hardware and/or software. In the case of a hardware-type embodiment, the interfaces can be part of a so-called system ASIC, for example, which contains very different functions of the apparatus. However, it is also possible for the interfaces to be dedicated integrated circuits or to consist at least in part of discrete components. In the case of a software-type embodiment, the interfaces can be software modules which are present on a microcontroller in addition to other software modules, for example.

A computer program product with program code is also advantageous, which may be stored on a machine-readable medium such as a semiconductor memory, a hard disk drive or an optical memory and which is used to carry out the method according to any one of the embodiments described above when the program product is executed on a computer or an apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of expedient exemplary embodiments of the present invention, the same or similar reference signs are used for the elements with a similar effect illustrated in the various figures, with a repeated description of these elements being dispensed with.

Figure 1:
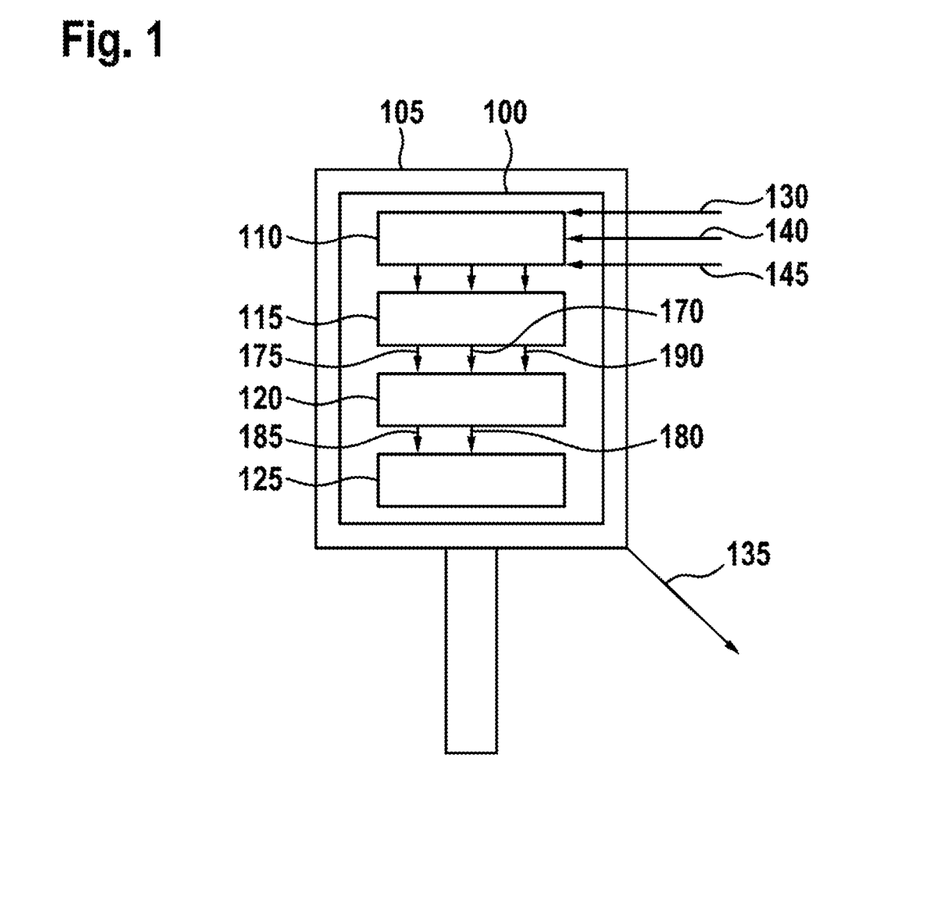
FIG. 1 shows a schematic illustration of an apparatus for estimating the height of a reflector of a vehicle on the basis of an apparatus as per one exemplary embodiment.

FIG. 1 shows a schematic illustration of an apparatus 100 for estimating the height of a reflector of a vehicle as per one exemplary embodiment. As per one exemplary embodiment, the apparatus 100 is installed in a transmitter device 105 for monitoring traffic.

The apparatus 100 comprises a reading device 110, a specifying device 115 and an ascertaining device 120. As per one embodiment, the apparatus 100 moreover comprises a checking device 125. The reading device 110 is initially embodied to read at least one reflection signal 130 from the reflector of the vehicle at one time, the at least one reflection signal 130 representing at least one information item in respect of a relative speed of the vehicle. Here, the at least one reflection signal 130 further represents an information item in respect of a relative distance of the vehicle from the signal-emitting transmitter device 105, the signal-emitting transmitter device 105 having previously sent a transmission signal 135, the reflection of which forms the at least one reflection signal 130, and/or in respect of a height angle, at which the reflector is disposed in relation to the signal-emitting transmitter device 105. The reading device 110 is furthermore embodied to read at least one second reflection signal 140 from the reflector of the vehicle at a second time, the at least one second reflection signal 140 likewise representing an information item in respect of a relative speed of the vehicle. The reading device 110 is finally embodied to read at least one further reflection signal 145 from a further reflector of the vehicle at a further time. The specifying device 115 of the apparatus 100 is now embodied to specify an estimated value 170 for the speed of the vehicle. Here, the ascertainment device 120 is embodied to ascertain an estimated value 180 for the height of the reflector using the relative distance of the vehicle from the signal-emitting transmitter device 105 or the apparatus 100 and the height angle, at which the reflector of the vehicle is disposed in relation to the signal-emitting transmitter apparatus 105 or the apparatus 100, the estimated value 180 for the height of the reflector further being ascertained using the information in relation to the relative speed of the vehicle from the second reflection signal 140. Here, the ascertainment device 120 is finally embodied to calculate the height of the reflector of the vehicle using a known height of the transmitter device 105. Optionally, the apparatus 100 has a checking device 125, the checking device 125 being embodied to check whether the estimated value 180 for the height is located within a tolerance range of between 0 and 4 meters above the roadway, the specifying device 115 specifying a new estimated value 175 for the speed of the vehicle and the ascertaining device 120 ascertaining a new estimated value 185 for the height of the further reflector using the relative distance of the vehicle from the signal-emitting transmitter device 105 and the height angle, at which the reflector is disposed in relation to the signal-emitting transmitter apparatus 105, if the estimated value 180 for the height is located outside of this tolerance range. The checking device 125 is further embodied to check whether the estimated value 180 for the height or the further estimated value 185 for the height lies within this tolerance range, the specifying device specifying, for the speed of the vehicle, a new estimated value 190 for the speed if the estimated value 180 for the height or the further estimated value 185 for the height is located outside of the tolerance range. Here, the checking device 125 repeats a check until the estimated values 180 and 185 for the height are located within the tolerance range.

Figure 2:
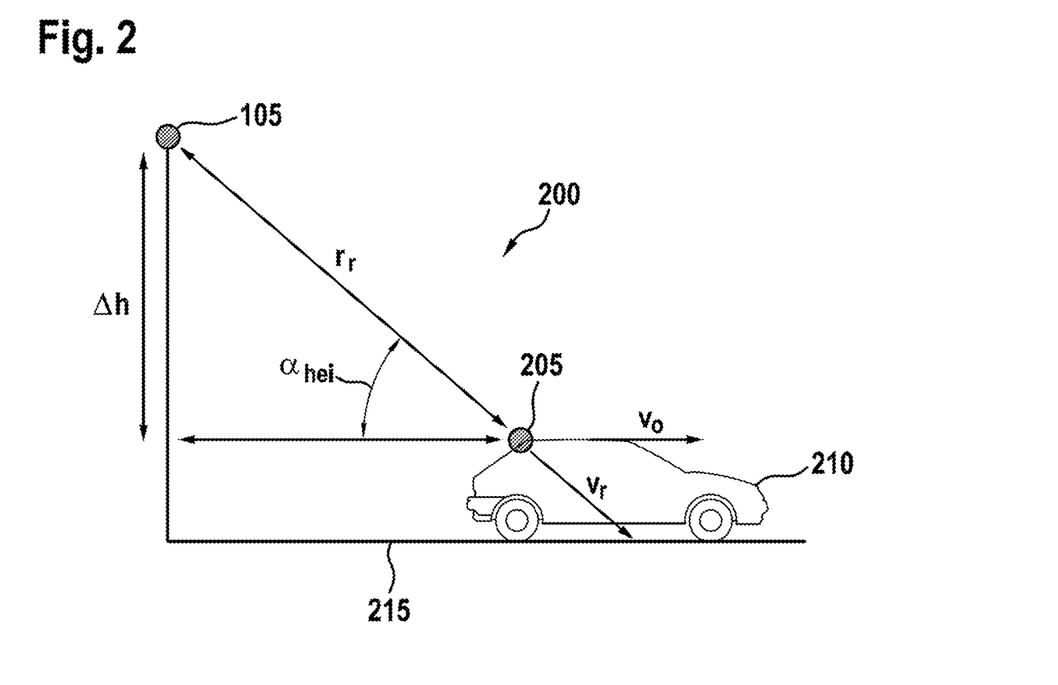
FIG. 2 shows a schematic side view of a system structure for estimating the height of a reflector of a vehicle on the basis of an apparatus as per one exemplary embodiment.

FIG. 2 shows a schematic side view of a system structure 200 for estimating the height of a reflector 205 of a vehicle 210 on the basis of an apparatus as per one exemplary embodiment. In particular, the system structure 200 can be carried out using the apparatus, presented in FIG. 1, for estimating the height of a reflector 205 of a vehicle 210. An edge or corner of the body of the vehicle 210, at which a radar beam is reflected and reflected back as a reflection signal to the apparatus as per one exemplary embodiment, can serve as a reflector 205 in this case.

The schematic system structure 200 comprises a signal-emitting transmitter device 105 stumbled at an edge of the road, the transmitter device 105 being a traffic monitoring system, for example a speed camera, as per one exemplary embodiment. A vehicle 210, the vehicle 210 being an automobile as per one exemplary embodiment, moves along a direction of travel on a road. The vehicle 210 at least comprises the at least one reflector 205. A transmission signal, for example a radar beam (not illustrated), which captures the reflector 205 of the vehicle 210, emanates from the transmitter device 105. Here, the radar beam is partly reflected by the reflector 205 and a reflected reflection signal (not illustrated) is received and evaluated by the transmitter device 105. If the vehicle 210 is observed over a plurality of times, the progress of the vehicle 210 can be captured by assigning the reflection signals among themselves. The relative angle of the reflector 205 can be estimated from the progress, and hence it is possible to determine the absolute vehicle speed $v_0$. Knowledge about the direction of travel of the vehicle 210 helps with the correct assignment of the reflection signals. The spatial position of the reflections and the relative vehicle speed $v_r$ are used for the assignment.

The transmitter device 105 is embodied to measure three quantities: the relative distance or spacing $r_r$ of the reflector 205 or of the vehicle 210 from the transmitter device 105, the relative angle of the reflector 205 and the relative speed $v_r$ of the vehicle 210. The relative speed $v_r$ of the vehicle 210 is the speed at which the reflector 205 of the vehicle 210 moves to or away from the transmitter device 105 in the radial direction. However, the relative speed $v_r$ is only a speed component of a real absolute vehicle speed $v_0$, with which the vehicle 210 moves on the roadway 215 in a direction of travel. The relative speed $v_r$ of the vehicle 210 is derived directly from the Doppler frequency of the radar radiation reflected by the reflected 205. However, the relative speed could also be calculated from the still unknown absolute vehicle speed $v_0$, the direction of travel of the vehicle and/or the height angle $\alpha_{hei}$, the height angle $\alpha_{hei}$ arising from the height difference $\Delta h$ between the transmitter device 105 and the roadway 215. In the case of an assumed speed of the vehicle 210, this being an approximate initial estimate for the vehicle speed, and the known installation height of the transmitter device 105 above the roadway 215, it is possible to analytically determine the height of each individual reflector 205 of the vehicle 210. Thus, an estimated value for the speed of the vehicle 210 is specified.

Figure 3:
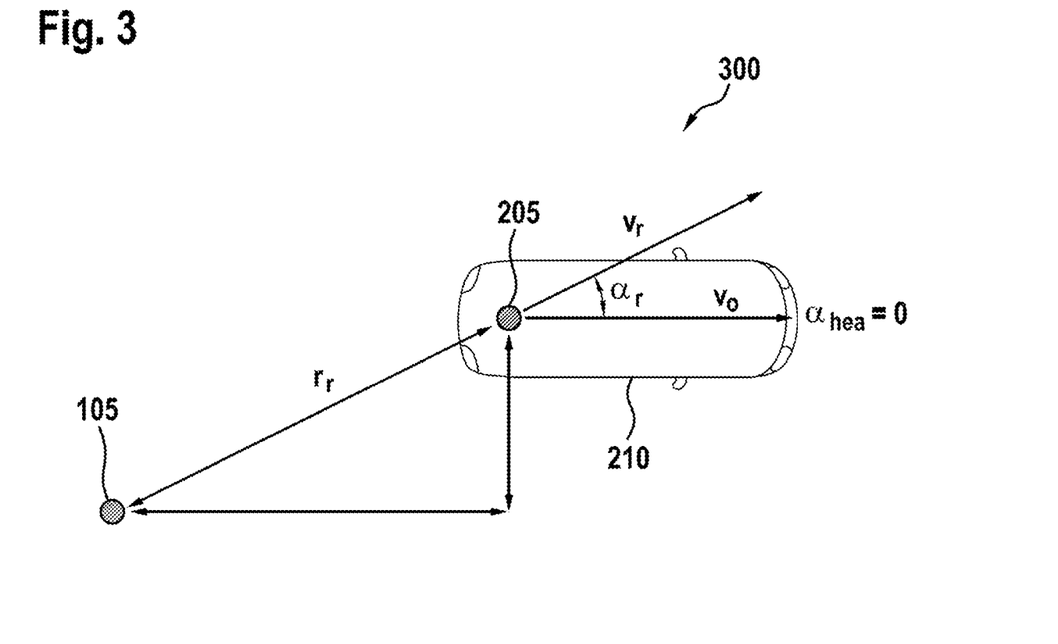
FIG. 3 shows a schematic top view of a system structure for estimating the height of a reflector of a vehicle on the basis of an apparatus as per one exemplary embodiment.

FIG. 3 shows a schematic top view of a system structure 300 for estimating the height of a reflector 205 of a vehicle 210 on the basis of an apparatus as per one exemplary embodiment. Here, the system structure 300 shown in FIG. 3 could be the same system structure as in FIG. 2 as per one exemplary embodiment.

The schematic system structure 300 comprises a signal-emitting transmitter device 105, which is developed at a road edge. On a road, a vehicle 210 is moving in a direction of travel $\alpha_{hea}$. The vehicle 210 at least comprises the one reflector 205. A transmission signal, for example a radar beam (not illustrated), which captures the reflector 205 of the vehicle 210, emanates from the transmitter device 105. Here, the radar beam is partly reflected by the reflector 205 and a reflected reflection signal (not illustrated) is received and evaluated by the transmitter device 105. As already illustrated in FIG. 2, the transmitter device 105 is embodied to measure three quantities: the relative distance $r_r$ of the reflector 205 or of the vehicle 210 from the transmitter device 105, the relative angle $\alpha_r$ of the reflector 205 and the relative speed $v_r$ of the vehicle 210. The relative angle $\alpha_r$ of the reflector 205 refers to the angle which, proceeding from the reflector 205, is spanned between the axis of the direction of travel $\alpha_{hea}$ and a straight line of the relative speed $v_r$ of the vehicle 210. The relative angle $\alpha_r$ is ascertained according to the principle of the triangulation calculation. The known angle of travel $\alpha_{hea}$ or the known direction of travel $\alpha_{hea}$ of the vehicle 210 and the measured relative angle $\alpha_r$ of the reflector 205 are included in the estimate for the height of the reflector 205, but are assumed to be 0° in each case below for a better illustration of the method.

If the absolute speed $v_0$ of the vehicle 210 and the direction of travel $\alpha_{hea}$ are known, the height of the individual reflector 205 in relation to the transmitter device 105 can be calculated directly from the relative speed $v_r$. However, this approach is less suitable for practical applications since, as a rule, the direction of travel $\alpha_{hea}$ is known, but not the absolute vehicle speed $v_0$. There are a number of assumptions that should be taken into account if the direction of travel $\alpha_{hea}$ is known. Thus, the assumption is made that all reflectors 205 of the vehicle 210 are at the same speed and have the same direction of travel $\alpha_{hea}$. Further, different relative speeds $v_r$ arise from the different arrangement heights of the reflectors 205 on the vehicle 210; however, this effect reduces with increased distance of the vehicle 210 from the transmitter device 105. Finally, the lowest height value of a reflection cannot be located below the roadway.

Figure 4:
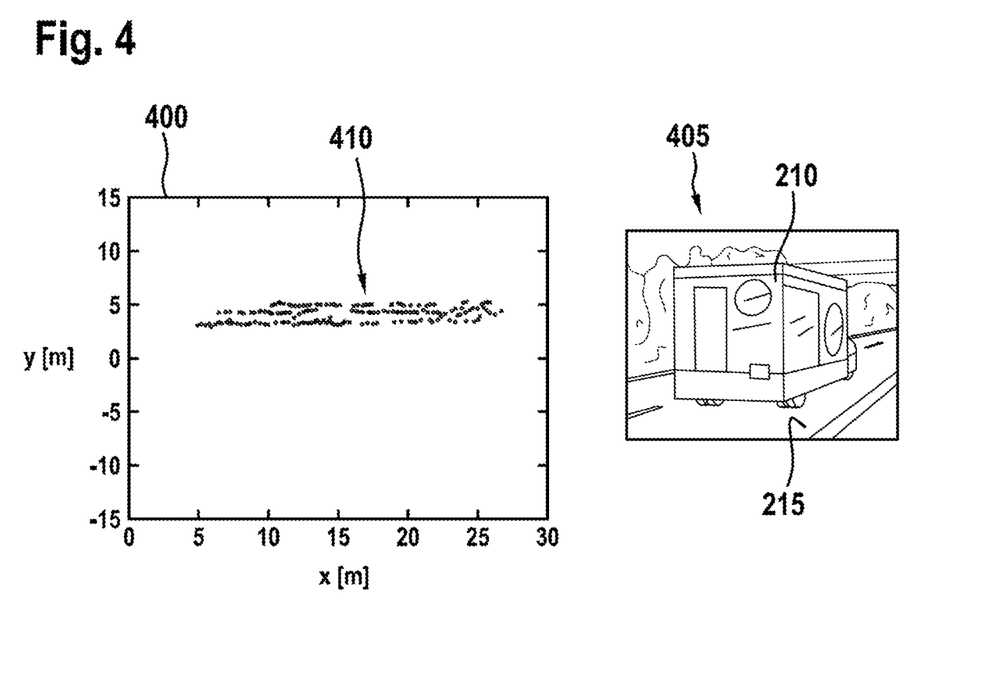
FIG. 4 shows a coordinate system for illustrating a plurality of collected reflections for a certain time interval as per one exemplary embodiment.

FIG. 4 shows a coordinate system 400 for illustrating a plurality of collected reflections 410 for a certain time interval as per one exemplary embodiment. In addition to the coordinate system 400, FIG. 4 moreover comprises a camera image 405 of a vehicle 210 traveling on a roadway 215, the goal being that of estimating a height of the reflectors of this vehicle 210. As per one exemplary embodiment, the vehicle 210 is a small delivery truck.

The x, y coordinate system 400 shows an image representation of a plurality of collected reflections 410 of the reflector at a certain time or within a certain time interval. Thus, the certain time can be the time at which a first reflection signal was read or the second time at which a second reflection signal was read or any further time at which a further reflection signal of a further reflector of the vehicle 210 was read. The reflections captured in the process are projected onto a reference time which, depending on the exemplary embodiment, is identical to one of the aforementioned times or else differs therefrom. According to one exemplary embodiment, the coordinate system 400 images or projects the collected reflections 410 using the estimated value for the speed and the known direction of the travel of the vehicle 210 for a time interval of 1.7 seconds. If the model assumptions such as speed of the vehicle 210, direction of travel of the vehicle 210, etc., are correct, the reflections 410 of the respective reflectors all overlay at one time and reproduce the shape of the vehicle 210 or at least the two sides of the vehicle shape that bring about a reflection of the radar beam. Here, the reflections at a certain time are virtually congruent in the illustrated FIG. 4.

Figure 5:
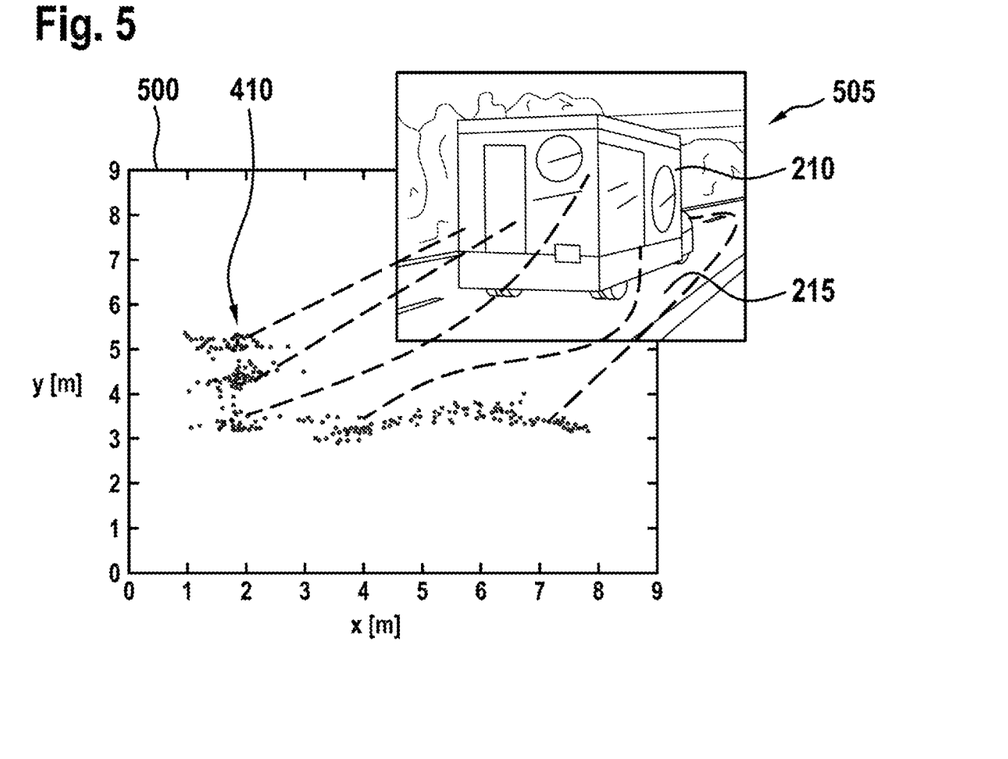
FIG. 5 shows a coordinate system for illustrating a plurality of projected reflections for a certain time interval as per one exemplary embodiment.

FIG. 5 shows a coordinate system 500 for illustrating a plurality of projected reflections 410 for a certain time interval as per one exemplary embodiment. Here, the coordinate system 500 shown in FIG. 5 could be the same coordinate system as in FIG. 2 as per one exemplary embodiment. In addition to the coordinate system 500, FIG. 4 comprises a camera image 505, overlapping the coordinate system 500, of a vehicle 210 traveling on a roadway 215. As per one exemplary embodiment, the vehicle 210 is a small delivery truck.

The x, y coordinate system 500 shows a projection of a plurality of captured reflections 410 of the reflector. In the case of an ideal projection, as elucidated in FIG. 5, all reflections are projected onto an "L", i.e., the vehicle surface. Here, the long side and the short side of the projected "L" are perpendicular to one another. The scattering or the spatial distance of the reflections 410 from the axes is minimal here. The projected reflections 410 are linked with the camera image 505 in order to graphically represent the reflectors of the vehicle 210 from which the projected reflections 410 originate. However, it is not mandatory here for an "L" to be formed. Depending on the reflection properties of the vehicle 210, it may only be the short or the long side of the "L" that is captured. However, it is true that all collected reflections 410, which belong to the same vehicle 210, can be projected onto a common object speed.

Figure 6:
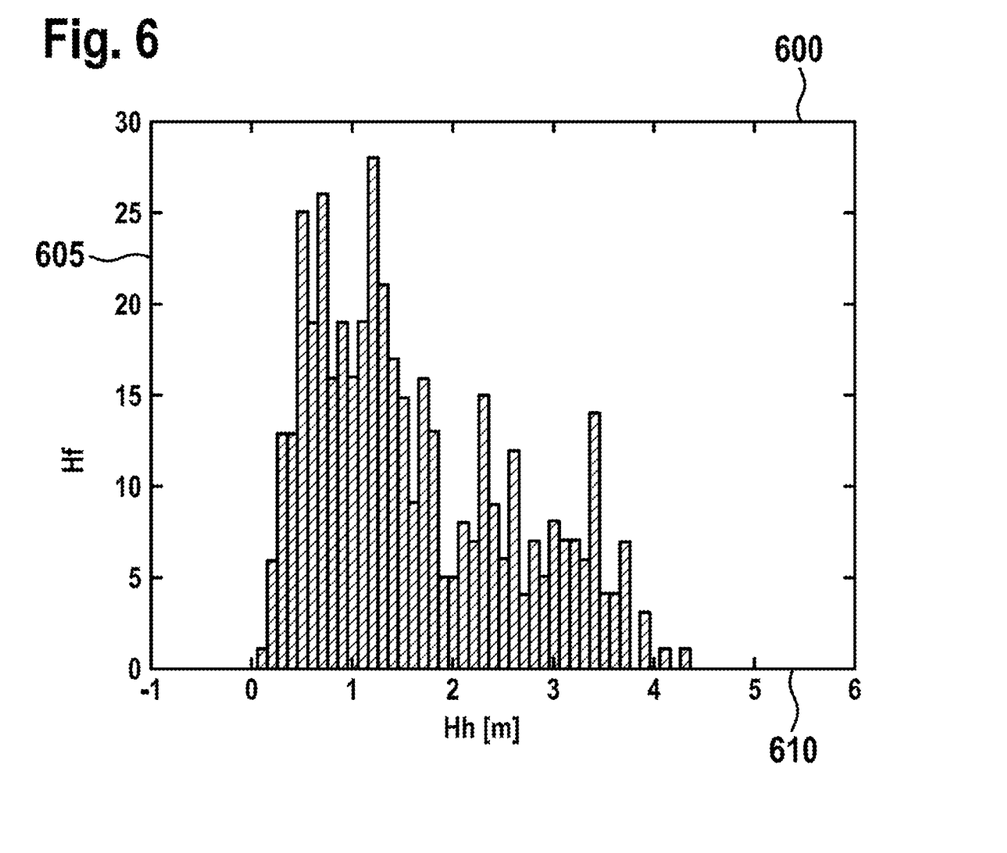
FIG. 6 shows a frequency histogram of a height distribution of reflectors of a vehicle for an estimated value for the speed as per one exemplary embodiment.

FIG. 6 shows a frequency histogram 600 of a height distribution of reflectors of a vehicle for an estimated value for the speed as per one exemplary embodiment. The frequency histogram 600 shown here is an example of a histogram with a constant class width, in which the absolute frequencies (Hf) of the projected reflections are plotted along the ordinate 605. By contrast, the abscissa 610 plots the height distribution, the height distribution comprising values between −1 meter and 6 meters. However, the estimated value for the height should be located within a tolerance range of between 0 and 4 meters above a roadway.

The relative height (Hh) of each reflector of the vehicle is determined analytically using the estimated value for the speed. To this end, the following formula can be used:

$$v_o = \frac{v_r}{\cos(\alpha_{height}) \cdot \cos(\alpha_{head} + \alpha_r)}$$

An estimated value for the speed of 21.0822 m/s is assumed. From this, a distribution of reflectors against height emerges. Depending on whether the assumed speed is too fast or too slow, the height distribution of the reflections is situated above (>0 meters) or below (<0 meters) the level of the roadway. The assumed speed can be corrected analytically or iteratively such that the lower edge of the height distribution is kept level with the roadway plane at 0 meters and the upper edge of the height distribution does not exceed 4 meters. The target height distribution can be restricted further by further restrictions and/or various model assumptions. Finally, this yields the absolute speed of the vehicle and the height of each reflector above the roadway.

Figure 7:
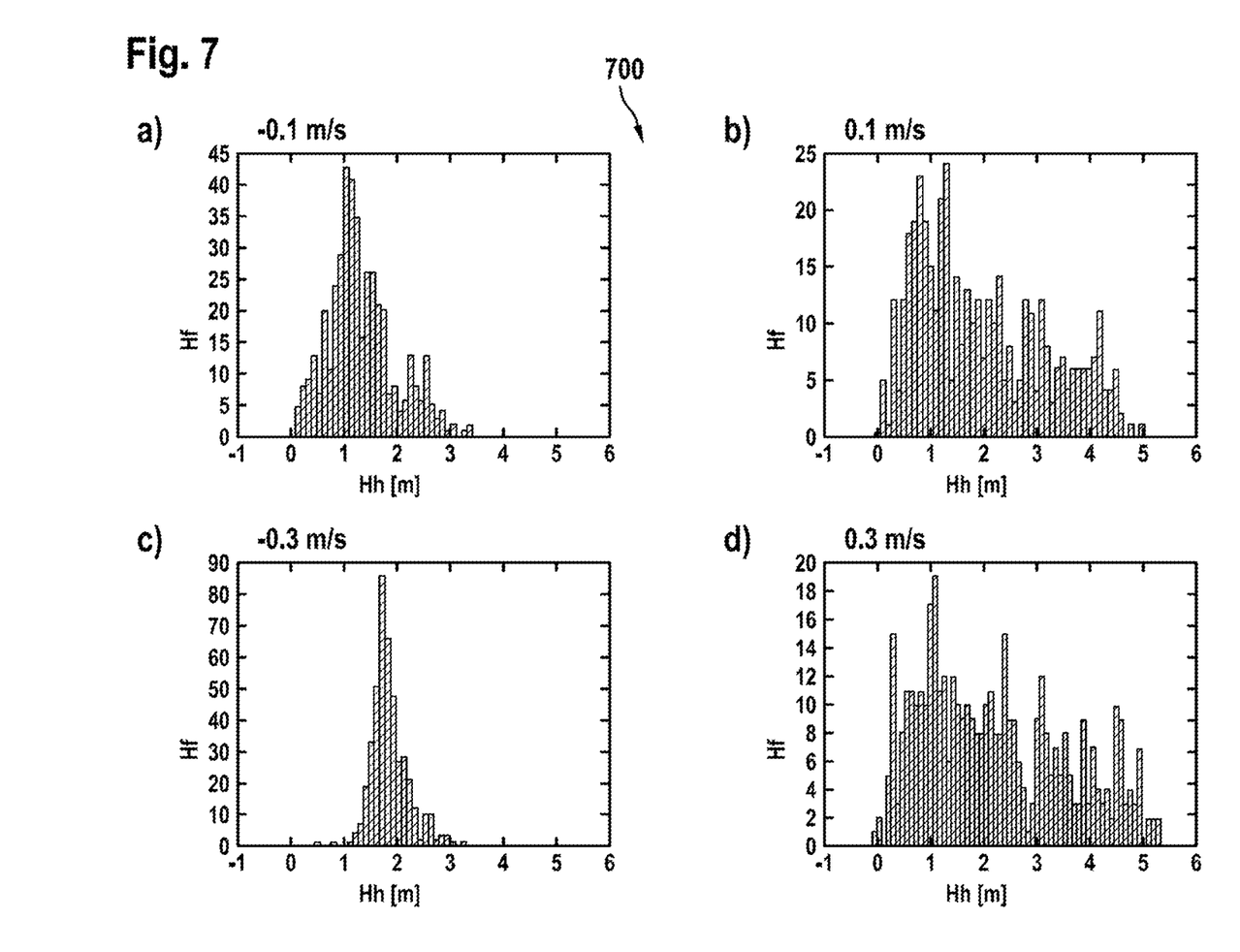
FIG. 7 shows four frequency histograms of a height distribution of reflectors of a vehicle for alternative estimated values for the speed as per one exemplary embodiment.
Figure 8:
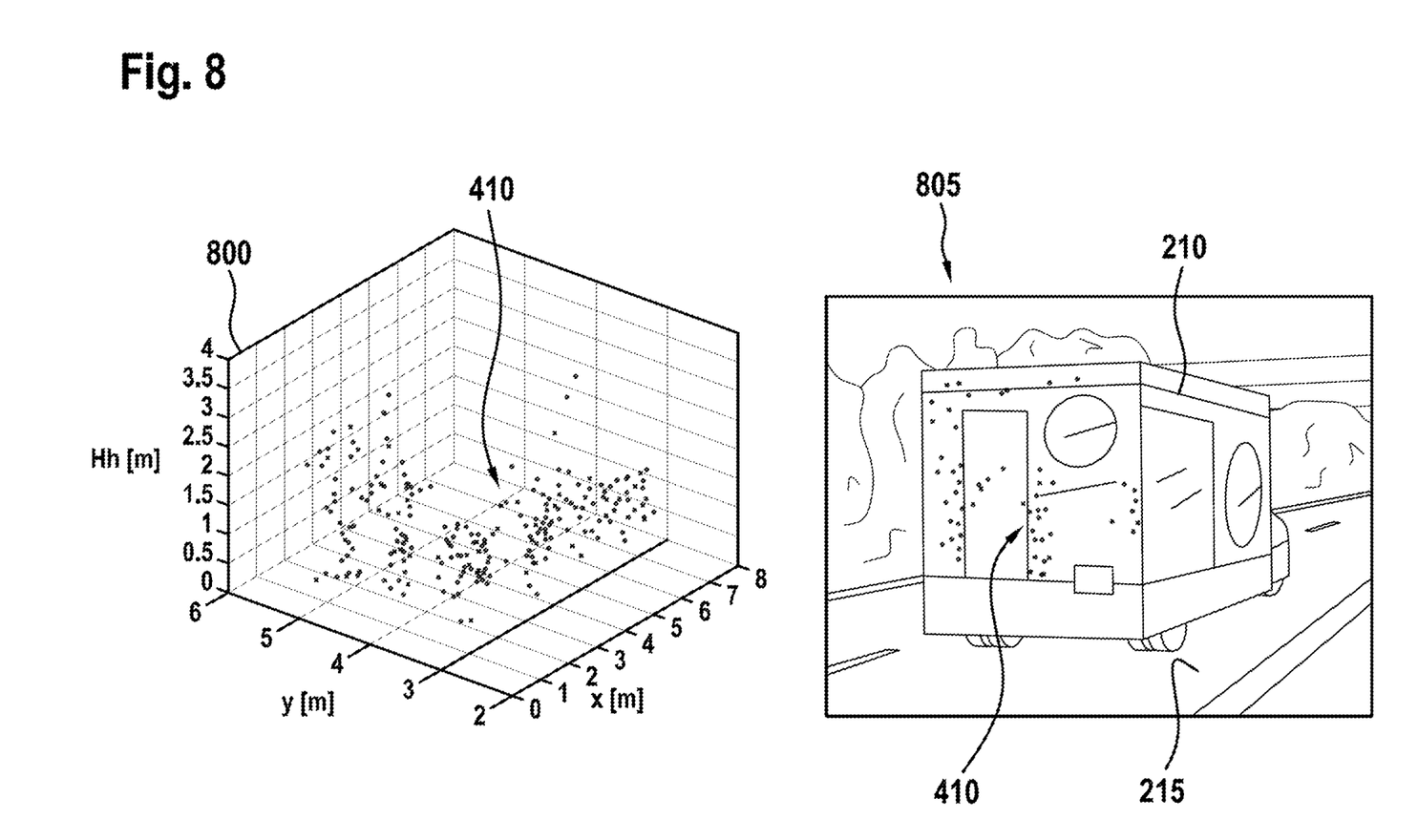
FIG. 8 shows a view of a 3D surface diagram for the three-dimensional representation of a plurality of reflections as per one exemplary embodiment.

FIG. 7 shows four frequency histograms 700 of a height distribution of reflectors of a vehicle for alternative estimated values for the speed as per one exemplary embodiment. FIG. 7 illustrates various alternative speeds for the example used in FIG. 6. The absolute frequencies (Hf) of the projected reflections are each plotted on the ordinate, the abscissa plotting the distribution of the heights (Hh) comprising values of between −1 meter and 6 meters. However, the estimated value for the height should be located within a tolerance range of between 0 and 4 meters above a roadway. Thus, the estimated value for the speed of 21.0822 m/s was corrected lower by −0.1 m/s in FIG. 7a, the estimated value for the speed of 21.0822 m/s was corrected higher by +0.1 m/s in FIG. 7b, the estimated value for the speed of 21.0822 m/s was corrected lower by −0.3 m/s in FIG. 7c, and the estimated value for the speed of 21.0822 m/s was corrected higher by +0.3 m/s in FIG. 7d. The estimated value for the speed is corrected such that the height distribution satisfies certain specifications. Here, reflections do not occur above the tolerance limit of 4 meters and the vehicles do not float over the roadway but, nevertheless, there are only a few reflections close to the ground. In the FIGS. 7b and d, the estimated value for the speed was in each case increased by 0.1 m/s and 0.3 m/s, respectively. Reflections above 4 meters can now be found in the height distribution. In FIG. 7c, reflections only occur above 1 meter height. By contrast, FIG. 7a, in which the speed has been reduced by −0.1 m/s, meets the stated assumptions FIG. 8 shows a view of a 3D surface diagram 800 for the three-dimensional representation of a plurality of reflections 410 as per one exemplary embodiment. Here, as per one exemplary embodiment, the 3D surface diagram 800 shown in FIG. 8 could be a spatial embodiment of the coordinate system from FIG. 5. In addition to the 3D surface diagram 800, FIG. 8 shows a camera image 805 of a vehicle 210 traveling on a roadway 215. As per one exemplary embodiment, the vehicle 210 is a small delivery truck.

The 3D surface diagram 800 is a three-dimensional diagram, which is useful for examining desired response values. Here, a difference is formed between the estimated value for the speed of 21.0822 m/s and the correction value of −0.1 m/s from FIG. 7 (=20.9822 m/s), with a three-dimensional view of the reflections 410 arising herefrom. Here, the 3D surface diagram 800 shows how a response variable relates to two predictor variables. The surface diagram 800 contains the following elements: predictors on the x- and y-axis and a continuous surface, which represents the response values on the z-axis, the response values being a height distribution of the reflections 410. The three-dimensional points of the height distribution of the reflections 410 are transferred to the camera image 805, with the shape of the vehicle 210 and prominent reflect positions being clearly identifiable in this case.

Figure 9:
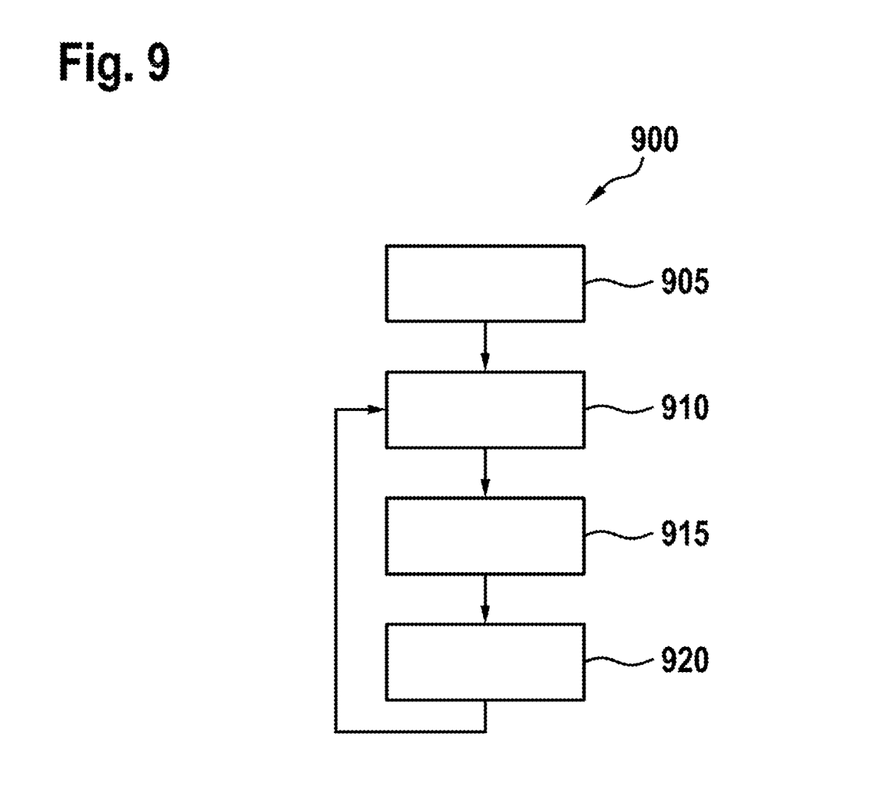
FIG. 9 shows a flowchart of an exemplary embodiment of a method for estimating the height of a reflector of a vehicle as per one exemplary embodiment.

FIG. 9 shows a flowchart of an exemplary embodiment of a method 900 for estimating the height of a reflector of a vehicle as per one exemplary embodiment. The method 900 can be carried out using the apparatus, presented in FIG. 1, for estimating the height of a reflector of a vehicle.

The method 900 initially includes a step 905, in which at least one reflection signal from the reflector of the vehicle is read at one time, the at least one reflection signal representing at least one information item in respect of a relative speed of the vehicle. Further, the method 900 includes a step 910, in which an estimated value for the speed of the vehicle is specified. The method 900 furthermore includes a step 915, in which an estimated value for the height of the reflector is ascertained using the relative speed of the vehicle and the estimated value for the speed of the vehicle. Finally, the method 900 can include a step 920, in which a check is carried out as to whether the estimated value for the height is located within a tolerance range, the steps 910 and 915 being repeated if the estimated value for the height is located outside of this tolerance range, in particular with a new estimated value for the speed being specified for the speed of the vehicle in repeated step 910.

Should an exemplary embodiment comprise an "and/or" link between a first feature and a second feature, this should be read to the effect of the exemplary embodiment including both the first feature and the second feature according to one embodiment and including either only the first feature or only the second feature according to a further embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for estimating the height of a reflector of a vehicle, the method including the following steps:
reading at least one reflection signal from the reflector of the vehicle at one time, the at least one reflection signal representing at least one information item in respect of a relative speed of the vehicle;
specifying an estimated value for the speed of the vehicle; and
ascertaining an estimated value for the height of the reflector using the relative speed of the vehicle and the estimated value for the speed of the vehicle,
wherein at least one further reflection signal from a further reflector of the vehicle is read in the reading step, the at least further reflection signal representing an information item in respect of a relative speed of the vehicle, a further estimated value for the height of the further reflector being ascertained in the ascertaining step using the information item in respect of the relative speed of the vehicle from the further reflection signal, and
wherein a check is carried out in a checking step as to whether the estimated value for the height or the further estimated value for the height is located within a tolerance range, the specifying and ascertaining steps being carried out repeatedly if the estimated value for the height and/or the further estimated value for the height are located outside of the tolerance range, with a new estimated value for the speed being specified for the speed of the vehicle in the repeated specifying step.

2. The method as claimed in claim 1, wherein the reflection signal in the reading step further includes an information item in respect of a relative distance of the vehicle from a signal-emitting transmitter device, the signal-emitting transmitter apparatus emitting a transmission signal, the reflection of which forms the reflection signal, and/or in respect of a height angle, at which the reflector is disposed in relation to the signal-emitting transmitter apparatus, with, in the ascertaining step, the estimated value for the height of the reflector being further ascertained using the information item in respect of the relative distance of the vehicle from the signal-emitting transmitter device and/or the height angle, at which the reflector is disposed in relation to the signal-emitting transmitter apparatus.

3. The method as claimed in claim 1, wherein at least one second reflection signal from the reflector of the vehicle is read at a second time in the reading step, the at least one second reflection signal representing an information item in respect of a relative speed of the vehicle, the estimated value for the height of the reflector being further ascertained in the ascertaining step using the information item in respect of the relative speed of the vehicle from the second reflection signal.

4. A method for estimating the height of a reflector of a vehicle, the method including the following steps:

reading at least one reflection signal from the reflector of the vehicle at one time, the at least one reflection signal representing at least one information item in respect of a relative speed of the vehicle;

specifying an estimated value for the speed of the vehicle;

ascertaining an estimated value for the height of the reflector using the relative speed of the vehicle and the estimated value for the speed of the vehicle; and checking as to whether the estimated value for the height is located within a tolerance range, the specifying and ascertaining steps being carried out repeatedly if the estimated value for the height is located outside of the tolerance range, with a new estimated value for the speed being specified for the speed of the vehicle in the repeated specifying step.

5. The method as claimed in claim 4, wherein a check is carried out in the checking step as to whether the estimated value for the height is located within the tolerance range of between 0 and 4 meters on or above a roadway.

6. The method as claimed in claim 1, wherein the ascertaining step calculates the height of the reflector of the vehicle using a known height of the transmitter device.

7. An apparatus for estimating the height of a reflector of a vehicle, said apparatus being embodied to drive and/or carry out the steps of a method as claimed in claim 1 in corresponding devices.

8. A computer program product with program code for carrying out the method as claimed in claim 1 when the program product is executed on an apparatus.

* * * * *